Nov. 14, 1950  L. C. WEATHERS  2,529,526
ALTERNATING CURRENT COMMUTATOR MACHINE
Filed July 28, 1948
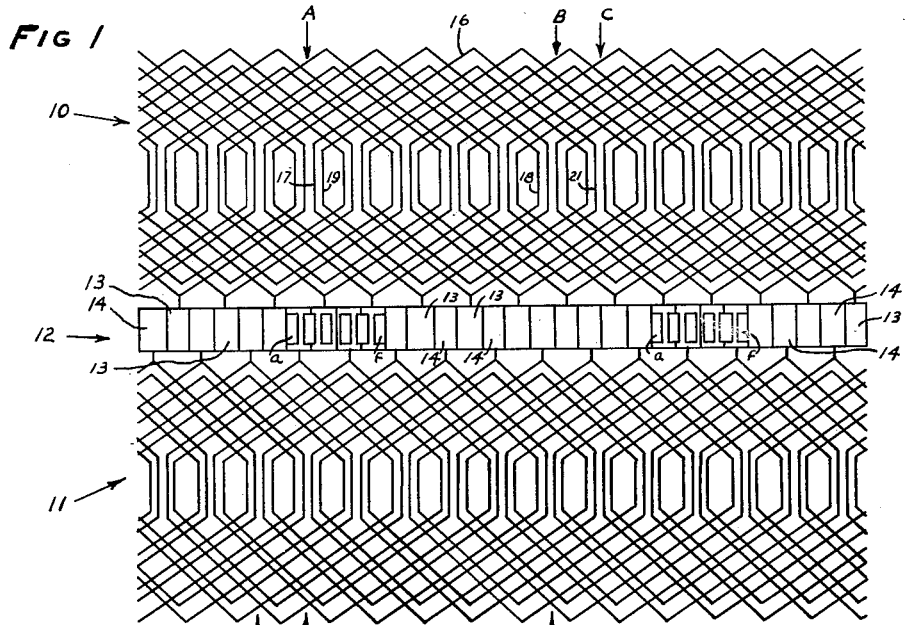
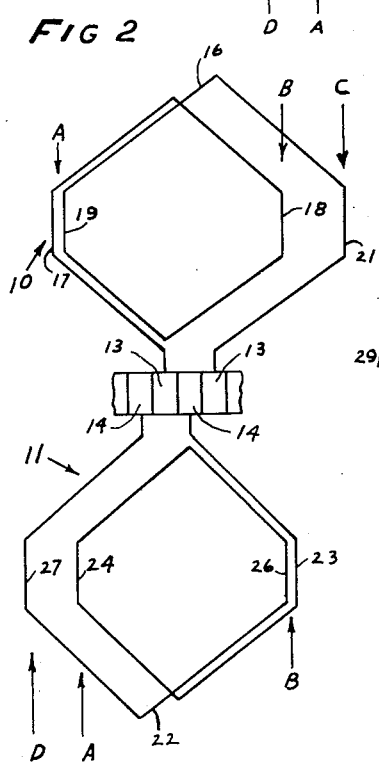
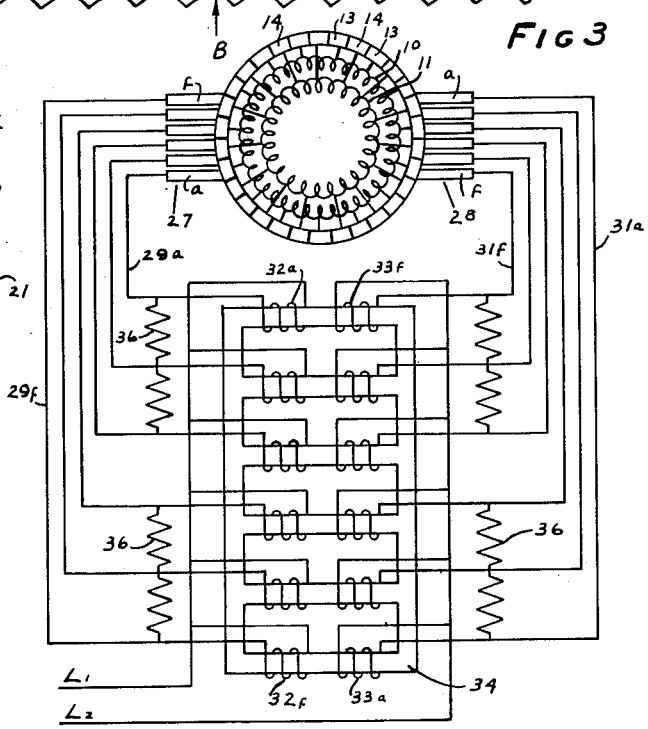
INVENTOR.
LELAND CLAY WEATHERS
BY Bacon & Thomas
attys.

Patented Nov. 14, 1950

2,529,526

UNITED STATES PATENT OFFICE 2,529,526

ALTERNATING CURRENT COMMUTATOR MACHINE

Leland Clay Weathers, Plymouth, Mich., assignor to Vickers Incorporated, Detroit, Mich., a corporation of Michigan Application July 28, 1948, Serial No. 41,114

6 Claims. (Cl. 318—244)

This invention relates to power transmission, and more particularly, to improved armature windings for rotating electrical machines of the commutator type and associated apparatus for preventing flow of armature coil short circuit currents in armature coils undergoing commutation.

Although the windings of the present invention may be employed with advantage in any type of machine having an armature and commutator including direct current machines, they have particular utility in rotating alternating current machines of the commutator type. One of the major difficulties in such machines has been unsatisfactory commutation due to the flow of armature coil short circuit currents through armature coils undergoing commutation. In such machines, the alternating mutual flux produced in the iron of the machine by the excitation circuit induces transformer voltages in the armature winding whether the armature is stationary or rotating. These voltages are separate and distinct from the speed voltages produced by movement of the armature conductors through the mutual flux due to rotation of the armature. It has been proposed in the prior art to balance speed voltages in the armature coils against the transformer voltages, for example, by producing an auxiliary flux in the iron of the machine which is 90° out of time phase with the flux in the excitation axis and which is also in space quadrature with the flux in the excitation axis. If the auxiliary flux has the proper magnitude relative to the flux in the excitation axis for a given speed, voltages in the coils undergoing commutation can theoretically be made to exactly cancel. Any variation in speed or excitation will, however, destroy the required balance and no practicable manner of balancing the speed voltages against transformer voltages under all conditions of speed and load has been developed. The problem is particularly acute in alternating current machines of the shunt type but the problem also exists in machines of both the series type and the repulsion type particularly in large size machines. The short circuit currents referred to cause excessive sparking and arcing at the commutator, resulting in rapid wear or destruction of the brushes and commutator, thus materially restricting the utility of rotating alternating current machines of the commutator type. The armature windings of the present invention form part of a system for eliminating the commutator difficulties just discussed.

The armature windings of the present invention involve a plurality of electrically independent closed windings all positioned in the same slots in the armature iron. They are employed in combination with brush structures made up of a plurality of brush elements so as to require that all armature coil short circuit currents flow through circuits external of the armature. Circuits appropriate for either alternating current or direct current machines can be inserted in such external circuits to substantially prevent such flow of short circuit currents depending upon the type of machines to which the windings of the present invention are applied.

Plural armature windings have been suggested in the prior art in conjunction with a single narrow brush per pole, or with brush structures made up of a plurality of brush elements. Such windings have either required a number of slots in the armature equal to the number of coils in each winding times the number of windings or have required the use of coils having different effective pitches or having non-uniform effective angular spacing around the armature. In accordance with the present invention a plurality of armature windings are provided in which the number of slots in the armature iron is equal to the number of coils in one of the windings and in which the coils of all of the windings have the same effective pitches and have their electrical centers uniformly distributed around the periphery of the armature. Each of the coils has portions of different pitches but all of the coils of all of the windings have the same conformation and each of the independent windings is the same as any of the other independent windings. By employing appropriate brush structures made up of a plurality of brush elements, all armature coil short circuit currents can be made to flow through circuits external of the armature and means can be inserted in such external circuits for substantially preventing flow of armature coil short circuit currents while at the same time the power currents in the armature can be properly distributed to the various armature windings.

It is therefore an object of the present invention to provide improved armature windings for rotating electrical machines of the commutator type.

Another object of the invention is to provide armature windings made up of a plurality of electrically independent windings in which all of the coils of all of the windings are of the same conformation and in which the number of armature slots required for the windings is equal to the number of coils in each winding.

Another object of the invention is to provide improved armature windings in which each of a plurality of electrically independent windings have coils made up of portions of different pitches but all of the coils have the same effective pitch and are uniformly electrically spaced from each other.

A further object of the invention is to provide improved armature windings made up of a plurality of electrically independent windings positioned in armature slots which are equal in number to the number of coils in each winding and in which all of the windings are electrically equivalent and the coils of all of the windings have the same effective pitch and angular displacement from each other.

Other objects and advantages of the invention will appear in the following description of a preferred embodiment shown in the attached drawing, in which:

Fig. 1 is a schematic diagram showing a developed dual winding;

Fig. 2 is a view similar to Fig. 1 showing a single coil of each winding of Fig. 1; and Fig. 3 is a schematic diagram illustrating a commutation system employing the windings of Fig. 1.

Referring more particularly to the drawing, the winding of Fig. 1 is shown as a two-pole winding but it is apparent that windings of any number of pairs of poles may be provided by merely duplicating the windings shown. The windings of Fig. 1 involve two electrically independent windings 10 and 11, the commutator 12 being shown at the central portion of the figure. In an actual machine, both of the windings 10 and 11 are on the same side of the commutator and in the same slots of the armature but it is impractical to draw one winding superimposed upon the other unless an unduly large scale is employed. The armature upon which the windings 10 and 11 are positioned may have a conventional iron structure provided with the usual winding slots and made up of laminations appropriate to the type of current flowing in the armature. Each of the groups of four conductors or coil sides at the mid-portion of the winding 10 represents the conductors positioned in a single slot and the same is true of the groups of four conductors or coil sides at the mid-portion of the winding 11. If the winding 11 is turned over in the drawing so as to be on the winding 10 it will be found that the groups of four coil sides of the winding 11 will be superimposed on the groups of the four coil sides of the winding 10 such that the groups of conductors or coil sides of the winding 11 occupy the same slots as the groups of conductors or coil sides of the winding 10. It will be found that with this arrangement the number of slots is equal to the number of coils in each winding.

The coils of the winding 10 are connected to alternate commutator bars 13 while the coils of the winding 11 are connected to alternate commutator bars 14. As is shown most clearly in Fig. 2, each of the coils 16 of the winding 10 is made up of two portions of different pitches. That is to say, the coil 16 has one end connected to a commutator bar 13, a coil side 17 positioned in a slot A, another coil side 18 positioned in a slot B, another coil side 19 positioned in the same slot A, and another coil side 21 positioned in a slot C, the coil terminating at another commutator bar 13. Similarly, the coil 22 has one end connected to a commutator bar 14, a coil side 23 positioned in the slot B, another coil side 24 positioned in the slot A, another coil side 26 also positioned in the slot B and another coil side 27 positioned in the slot D, the coil terminating at another commutator bar 14.

In the particular winding shown, the coils 16 and 22 each have a portion spanning the distance between six slots and a portion spanning the distance between seven slots in windings having 15 coils in each winding but it is apparent that each winding may have any number of coils as long as equal numbers of coils are employed in each winding. It is also apparent that the coils may have any desired effective pitch. The effective pitch of each coil of each winding is the average pitch of the portions of each coil which have different pitches. It will be found that the electrical centers of the coils of each of the windings are spaced from each other an electrical angular distance equal to the electrical angle between the centers of commutator bars to which such windings are connected and that the electrical centers of the coils of one winding are spaced from the electrical centers of the coils of the other winding an electrical angle equal to the electrical angle between the centers of adjacent commutator bars. All of the coils in both windings are the same in conformation and the two windings are the same except that one progresses about the armature in one direction while the other progresses about the armature in the other direction. In the dual winding shown, each of the two portions of each coil has the same number of conductors. The centers of the commutator bars are spaced from each other an electrical angle equal to the electrical angle between the centers of the slots divided by the number of windings and the number of commutator bars is equal to the total number of coils in both windings.

The active conductors of the various coils, i. e., the slot conductors, are arranged in groups which are spaced an electrical angle from each other which is equal to 360 electrical degrees divided by the number of coils in each winding in the 360 electrical degrees, and the electrical angle between the coils of one winding and the coils of the other winding is equal to 360 electrical degrees divided by the number of coils in all of the windings in the 360 electrical degrees, that is to say, the electrical angle between the centers of adjacent commutator bars.

The windings of the present invention result in a plurality of entirely separate and distinct windings which are not connected to each other and which are electrically symmetrical with respect to the commutator bars to which they are connected. It will be apparent that brush elements making contact with adjacent commutator bars only cannot short circuit the armature coil under any condition of operation and a single brush per pole which has a width slightly less than the width of a commutator bar plus twice the distance or space between commutator bars can be employed to entirely prevent flow of armature coil short circuit currents. Such a brush will, however, not provide for equal distribution of currents through the two armature windings, for example, in certain positions of the commutator, such a brush would make contact with a commutator bar connected to one of the windings only. Furthermore, such a brush element would not give sufficient contact area. For a practical machine, the currents in the two armature windings must be maintained substantially balanced between the two windings and between the two halves of each winding, otherwise the currents through the armature windings will vary at the commutator ripple frequency and a high impedance to flow of armature current between the brushes will be imposed on the circuit. On the other hand, a single brush per pole spanning several commutator bars will provide paths for armature coil short circuit currents directly through the brushes with resulting sparking and arcing at the commutator. The windings of the present invention therefore find their chief utility when employed with brush structures made up of a plurality of brush elements insulated from each other and arranged to require that all armature coil short circuit currents flow through external circuits. Such brush structures are shown diagrammatically in Fig. 3.

In Fig. 3, the windings 10 and 11 are shown diagrammatically with their coils connected to commutator bars 13 and 14, respectively. Brush structures 27 and 28, each made up of a plurality of brush elements $a$ to $f$, inclusive are shown, i. e., each made up of six brush elements spanning four commutator bars. At least six brush elements are required for proper distribution of armature current to the armature windings but more may be employed. The width and spacing of such brush elements are correlated to the width and spacing of the commutator bars so as to cause any armature coil short circuit currents to flow through external circuits while enabling proper distribution of armature current to the armature windings as disclosed in my copending application Serial No. 696,006, filed September 10, 1946, now Patent No. 2,505,018, granted April 25, 1950.

Each of the brush elements $a$ to $f$, inclusive, of brush structure 27 has an individual conductor $29a$ to $29f$, respectively, connected thereto and each of the brush elements $a$ to $f$, inclusive, of brush structure 28 has an individual conductor $31a$ to $31f$, respectively, connected thereto and any armature coil short circuit currents must flow through said individual conductors. The conductors $29a$ to $29f$ connect the brush elements $a$ to $f$ of the brush structure 27 to one end of individual reactor coils $32a$ to $32f$, respectively, and similarly, each of the conductors $31a$ to $31f$ connect the brush elements $a$ to $f$ of the brush structure 28 to one end of individual reactor coil $33a$ to $33f$, respectively. All of the reactor coils $32a$ to $32f$ and $33a$ to $33f$ are positioned upon a single reactor core 34 having six legs. All of the reactor coils $32a$ to $32f$ have their other ends connected to a conductor $L_1$ representing one side of a single phase alternating current line and each of the reactor coils $33a$ to $33f$ have their other ends connected to a conductor $L_2$ representing the other side of such line.

The arrangement of reactor coils upon the core 34 is such that magnetomotive forces due to armature power currents flowing through the reactor coils oppose each other so as to provide a low impedance for armature power current. On the other hand, magnetomotive forces due to armature coil short circuit currents add in the core 34 to produce a resultant flux thus presenting a high impedance to flow of armature coil short circuit currents. In fact, the control of armature coil short circuit current by the reactor coils is somewhat too rigid as it prevents a proper distribution of armature current to the windings 10 and 11. That is to say, in order to maintain balanced armature currents in the two windings and in the two halves of each winding, the current through each of the brush elements of the brush structures 27 and 28 must vary and in order to provide for such variation, shunt resistors 36 are provided between certain of the brush elements. The reactor structure of Fig. 3 is only one of a larger number of reactor structures or other means which may be employed to prevent flow of armature coil short circuit currents while providing for proper distribution of power currents in armature windings. Various alternate means for this purpose are shown in my copending application Serial No. 696,006, filed September 10, 1946.

It will be apparent from the above description of the invention that I have provided improved armature windings for rotating electric machines which are made up of a plurality of electrically independent similar windings having similar coils of the same effective pitch and with their electrical centers uniformly distributed around the armature without increasing the required number of slots in the armature. These windings, with proper brush structures, made up of a plurality of brush elements and means for preventing flow of armature coil short circuit currents in external circuits connected to the brush elements, result in substantial elimination of commutation difficulties.

This application is a continuation-in-part of my copending application Serial No. 696,006, filed September 10, 1946.

I claim:

1. In an electrical machine, an armature winding comprising a plurality of electrically independent similar windings each having a plurality of coils, a commutator having a plurality of commutator bars, the coils of each of said windings having their terminals connected to non-adjacent bars of said commutator, the active conductors of all of said coils being positioned in groups spaced an electrical angle equal to 360 electrical degrees divided by the number of coils in each winding in said 360 electrical degrees, each of the coils of said windings having a plurality of portions of different pitch positioned to effectively space the coils of one winding from the coils of another winding an electrical angle equal to the electrical angle between the centers of adjacent commutator bars.

2. In an electrical machine, an armature winding comprising a pair of electrically independent similar windings each having a plurality of coils, a commutator having a plurality of commutator bars, the coils of each of said windings having their terminals connected to alternate bars of said commutator, the active conductors of all of said coils being positioned in groups spaced an electrical angle equal to 360 electrical degrees divided by the number of coils in each winding in said 360 electrical degrees, each of the coils of said windings having two portions of different pitch positioned to effectively space the coils of one winding from the coils of another winding an electrical angle equal to the electrical angle between the centers of adjacent commutator bars.

3. In an electrical machine, an armature having a plurality of coil receiving slots therein, an armature winding comprising a plurality of electrically independent similar windings each having a plurality of coils equal in number to the number of slots in said armature, a commutator having a plurality of commutator bars equal in number to the total number of coils in all of said windings, the coils of each of said windings having their terminals connected to non-adjacent bars of said commutator spaced equal distances around said commutator, the active conductors of all of said coils being positioned in groups in said slots to thereby be spaced an electrical angle equal to 360 electrical degrees divided by the number of coils in each winding in said 360 electrical degrees, each of the coils of said windings having a plurality of portions of different pitch positioned to effectively space the coils of one winding from the coils of another winding an electrical angle equal to the electrical angle between the centers of adjacent commutator bars.

4. In an electrical machine, an armature having a plurality of coil receiving slots therein, an armature winding comprising a plurality of electrically independent similar windings each having a plurality of coils equal in number to the number of slots in said armature, a commutator having a plurality of commutator bars equal in number to the total number of coils in all of said windings, the coils of each of said windings having their terminals connected to non-adjacent bars of said commutator spaced equal distances around said commutator, the active conductors of all of said coils being positioned in groups in said slots to thereby be spaced an electrical angle equal to 360 electrical degrees divided by the number of coils in each winding in said 360 electrical degrees, each of the coils of said windings having the same conformation and having a plurality of portions of different pitch differing from each other by the distance between adjacent slots and positioned to effectively space the coils of one winding from the coils of another winding an electrical angle equal to the electrical angle between the centers of adjacent commutator bars.

5. In an electrical machine, an armature having a plurality of coil receiving slots therein, an armature winding comprising a pair of electrically independent similar windings each having a plurality of coils equal in number to the number of slots in said armature, a commutator having a plurality of commutator bars equal in number to the total number of coils in all of said windings, the coils of each of said windings having their terminals connected to alternate bars of said commutator, the active conductors of all of said coils being positioned in groups in said slots to thereby be spaced an electrical angle equal to 360 electrical degrees divided by the number of coils in each windings in said 360 electrical degrees, each of the coils of said windings having two portions of different pitch positioned to effectively space the coils of one winding from the coils of another winding an electrical angle equal to the electrical angle between the centers of adjacent commutator bars.

6. In an electrical machine, an armature having a plurality of coil receiving slots therein, an armature winding comprising a pair of electrically independent similar windings each having a plurality of coils equal in number to the number of slots in said armature, a commutator having a plurality of commutator bars equal in number to the total number of coils in all of said windings, the coils of each of said windings having their terminals connected to alternate bars of said commutator, the active conductors of all of said coils being positioned in groups in said slots to thereby be spaced an electrical angle equal to 360 electrical degrees divided by the number of coils in each winding in said 360 electrical degrees, each of the coils of said windings having the same conformation and having two portions of different pitch differing from each other by the distance between adjacent slots and positioned to effectively space the coils of one winding from the coils of another winding an electrical angle equal to the electrical angle between the centers of adjacent commutator bars.

LELAND CLAY WEATHERS.

REFERENCES CITED

The following references are of record in the file of this patent:

UNITED STATES PATENTS

| Number | Name | Date |
|---|---|---|
| 781,035 | Thomson | Jan. 31, 1905 |
| 789,435 | Latour | May 9, 1905 |
| 841,543 | Latour | Jan. 15, 1907 |
| 1,059,134 | Fornhander | Apr. 15, 1913 |